Oct. 8, 1929.  A. C. PETERSON  1,730,380
PRESELECTIVE CONSTANT MESH GEAR CHANGE MEANS
Filed Nov. 21, 1924
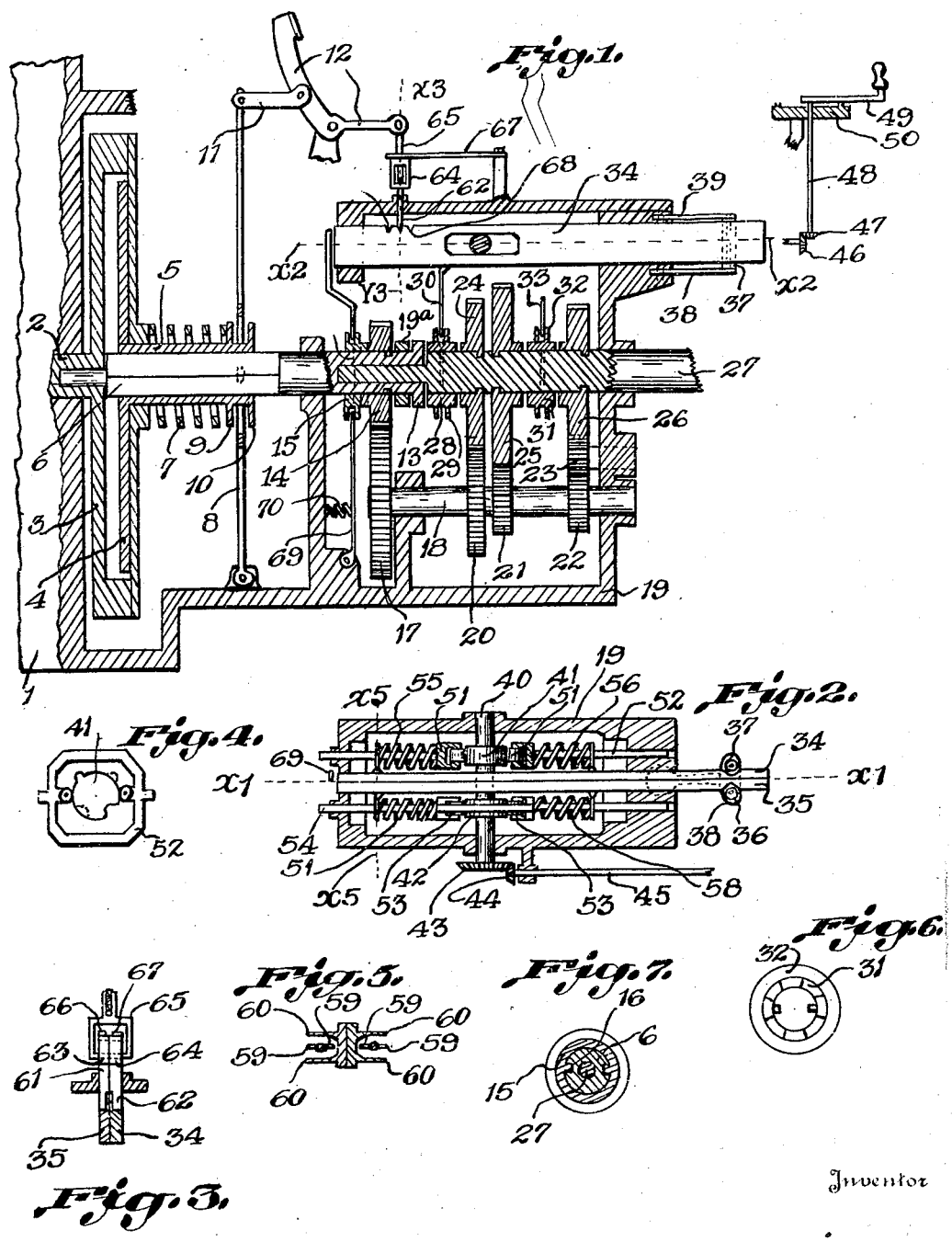

Patented Oct. 8, 1929

1,730,380

UNITED STATES PATENT OFFICE

ADOLPHE C. PETERSON, OF MINNEAPOLIS, MINNESOTA

PRESELECTIVE CONSTANT-MESH GEAR-CHANGE MEANS

Application filed November 21, 1924. Serial No. 751,343.

My invention relates to gear transmission means and particularly to a preselective change means preferably as applied to constant gear meshed means wherefore it is called a preselective constant mesh gear change means.

The principal objects of my invention are to provide a gear changing means which shall be simple in construction, simple in operation, efficient in gear changing, instantaneous in gear changing, efficient in the hands of novices, which shall have the advantages of ordinary gear means without the difficulty of gear changing, which shall render available a practicable method of preselection of gear changing, which shall be certain in operation, to render available a preselective gear changing means which shall be adaptable to constant or variable mesh gearing, which shall provide gear changing with the slightest interval of time in the declutching and gear changing process, and which shall in general be an improved gear change means.

The principal devices and combinations of devices comprising my invention are as hereinafter described and as defined in the claims.

In the accompanying drawings which illustrate my invention, like characters refer to like parts throughout the several views.

Referring to the drawings:

Figure 1 is a view chiefly in vertical cross section through a gear means or transmission applied to an engine (the latter shown diagrammatically only), some parts being shown in full side elevation, the cross section through the changing means being on the line $X^1 X^1$ of Figure 2.

Figure 2 is a view chiefly in horizontal cross section on the line $X^2 X^2$ of Figure 1 through the gear changing means or the principal actuating parts thereof, some parts being shown in plan view, and some parts being broken away.

Figure 3 is a view in detail of the shifter bar releasing means, being partly in cross section on the line $X^3 X^3$ of Figure 1.

Figure 4 is a detail view of the yoke portion of yoke arm 52 the central portion of yoke arm 54 being similar, showing also diagrammatically the location of cams relative to both the yoke arms.

Figure 5 is a cross section on line $X^5 X^5$ of Figure 2 showing the relation of pins 59 and yokes 60.

Figure 6 is a view of clutch 31, and Figure 7 of clutch 15.

Referring to the drawings, the numeral 1 indicates an engine of the usual internal combustion type applied to automotive vehicles the engine being shown only partly, that is broken away, as it is material only to show the connection of the crank shaft 2 of the engine through a fly-wheel clutch housing 3 and clutch disk 4, the latter having an integral shaft 5 with square bore as shown, the latter through its square bore being adapted to drive a shaft 6 having a square portion as shown upon its forward end cooperating with the shaft 5 whose square bore is slidable axially relatively to shaft 6 upon the latter. The shaft 5 and with it clutch disk 4 is normally yieldably extended by spring 7 so that the clutch disk is in clutch with the rear face disk of the fly-wheel clutch housing 3 but may be forced out of engagement by the yoke arm 8 which acts between collars 9, 10 as shown, the yoke arm 8 being trunnioned at its lower end and at its upper end by link 11 movable by the clutch pedal 12 to disengage the clutch disk. The shaft 6 constitutes the primary shaft of the gear transmission and carries at its end furthest removed from the clutch housing a so-called dog-clutch 13 permanently secured to it or formed integrally with it and carries also adjacent to the dog clutch 13 between the latter and the clutch housing a gear wheel 14 of the spur type which is freely mounted so that the shaft 6 may rotate relative to it within it without rotating it except when engaged by a dog-clutch 15 slidable axially upon shaft 6 but fixed to rotate with it by clutching dogs or pins 16 slidable in grooves in the shaft 6, the grooves being formed on the surface of the shaft and parallel to the axis of the shaft. The dog-clutch 15 is adapted to engage with cooperating dogs or clutches in the side of the spur gear 14 adjacent to it. The spur gear 14 is in constant mesh with a spur gear 17 which is secured to revolve with a secondary shaft 18, the latter being revolvably mounted in bearings in the gear box 19 as shown. The secondary shaft 18 carries secured to revolve with it spur gears 20, 21, 22, each of which are in constant mesh directly with or through an intermediate reversing spur gear 23 with spur gears 24, 25, 26 respectively, the latter gears being mounted revolvably upon the propeller shaft 27 so that they will not change their position axially of the latter shaft. The forward end of the propeller shaft 27 is as shown rotatably mounted in the rear end of the shaft 6 and has mounted upon it between the dog-clutch 13 and spur gear 24 an axially slidable double ended dog clutch 28 having collars 29 as shown, the dog clutch 28 being adapted to engage with dog clutch 13 when it is moved forward and adapted to engage with spur gear 24 when it is moved rearwardly (the spur gear 24 having a related dog clutch or dogs upon its lateral face) and being disengaged from either when it occupies an intermediate position, the double ended dog clutch 28 being movable into either of its positions through a yoke 30 by the means as hereinafter described. The propeller shaft 27 has also mounted upon it between spur gears 25, 26 slidable axially of the propeller shaft 27 another double ended dog-clutch 31 which when it is moved forward is adapted to engage with the spur gear 25 and when it is moved rearwardly is adapted to engage with the spur gear 26 and when it occupies an intermediate position is adapted to be disengaged from either spur gear 25, 26. The dog clutch 31 has collars 32 by which it is movable in the axial direction by yoke 33 by the means as hereinafter described. The dog clutches 28 and 31 are each although slidable axially fixed to revolve with the propeller shaft 27 by dogs or inwardly projecting pins acting or cooperating with grooves formed in the side or surface of the shaft 27. The yokes 30 and 33 are respectively fixed or formed integrally with shifter bars 34, 35, the latter being slidably mounted in the gear box 19 to have slidable motion in a direction parallel to the axis of the propeller shaft 27 and having an interlocking means consisting of vertically positioned rollers 36, 37 one on each remote side of the two shifter bars, the rollers 36, 37 being mounted individually upon vertical axes fixed each in the one end of two swinging levers or arms 38, 39, the opposite ends of the latter being pivotally mounted in the gear box 19 so that one is above and the other below the shifter bars 34, 35. The rollers 36, 37 have such cooperation with related grooves in the sides of the shifter bars that when either of the shifter bars is moved out of its mid or normal position the thickness of one bar is such that the rollers are held one of them fully seated in the groove of the other bar whereby movement of the other bar is prevented until both are again in the mid or normal position.

A cam shaft 40 is trunnioned in gear box 19 in a horizontal position with its axis at right angles to the shifter bars and passing through apertures in the shifter bars at their central portions as shown, whereby one cam 41 is located on one side of the shifter bars and the other cam 42 is located on the other side of the shifter bars and whereby a mitre gear 43 on the exterior end of the cam shaft is movable by a mitre gear 44 through a shaft 45, the latter being revolvable by mitre gears 46, 47 by shaft 48 and hand lever 49 the latter being upon a sector face 50 so that it is placeable in any of certain positions. The shaft 45 and its connections with lever 49 are so placed in a chassis preferably so that they are most convenient to an operator, it being noted that flexible shafts or other mediums not illustrated may be employed to this end. The cams 41 and 42 are adapted one to cooperate with and move by rollers 51 an actuating yoke bar 52 and the other through rollers 53 an actuating yoke bar 54, the yoke bars 52 and 54 being mounted in the gear box 19 so that they are individually slidable in a direction parallel to the propeller shaft 27 and parallel to the shifter bars. Each actuating yoke bar, 52, 54 bears placed upon it two coil springs 55, 56, and 57, 58 the springs being opposed between the wide yoke portion of each yoke bar and pins 59 upon the yoke bars, the position of the springs being such however that when a related yoke bar is moved out of its mid or normal position the related spring is compressed between the central yoke portion of the yoke bar and spring yokes 60 (four of them), one related to each spring, each shifter bar bearing two springs. In the normal or mid position of all the shifter bars and yoke bars the springs are each retained by its related pin upon the related yoke bar and do not affect the related shifter bar until the yoke bar is moved out of its mid position and the relative action is also such that when any yoke bar is moved and the shifter bar related is moved to an abnormal position or clutch engaging position, as hereinafter described, the related spring is then retained again by its related pin 59 so that it exerts no further effect upon the shifter bar.

The shifter bars 34, 35 are normally held in their mid- or normal position by retainer posts 61, 62 mounted and vertically slidable in the upper face or cover of the gear box 19, the retainer posts having each integral square loops 63, 64 at their ends with which a link 65 engages so that when the link 65 is lifted by the end of the clutch pedal 12 the link will lift both the posts 61, 62 in the extreme depression of the clutch pedal by the operator, that is in the extended position thereof after the clutch disk has been declutched, the relative action being such however that either posts 61, 62 may individually rise against the individually related leaf spring 66, or 67. The retainer posts 61, 62 individually cooperate at their lower ends with notches or depressions 68 in each shifter bar, there being three in each shifter bar, so that the shifter bars are both retained in the mid-position or (as removed) one in the mid and one in the clutch engaging position, until the link 65 is raised by clutch pedal 12.

The dog clutch 15 has collars as shown whereby a vertically pivoted yoke lever 69 normally retains the dog clutch 15 in engagement with the spur gear 14 but so that against the yieldable action of coil spring 70 acting upon the yoke lever 69, the latter may be moved and with it dog clutch 15 out of engagement by the thrust upon the upper end of the yoke lever 69 of the immediately above located end of the shifter bar related to the dog clutch 28 when the latter is moved to the position engaging the propeller shaft 27 directly with the dog-clutch 13 and its shaft 6.

In the operation of my device or its use, the engine 1 through the gear means as shown drives through propeller shaft 27 an automotive vehicle and the driver or operator thereof may at any time by turning cam shaft 40 by hand lever 49 cause the cams upon the cam shaft to effect movement of the actuating bars 52 or 54, the cams upon the surface of the cams 41, 42 as shown in Figure 4 being such that in any one position of the cam shaft, as predetermined, one actuating yoke bar only is moved in the one direction, in another position it is moved in the other direction and at intermediate or still other positions of the cam shaft the other actuating yoke bar is moved in one direction or another direction. Thereby as determined by the position of the hand lever 49 either one of the springs 55, 56, 57, 58 may be compressed between the central yoke of the actuating yoke bar and the related spring yoke 60 whereby there is effected a moving force upon the related shifter bar in the direction indicated by the compression of the spring and if thereupon the operator depresses the clutch pedal 12 the clutch disk is declutched and in the extreme declutching position of the pedal 12 the link 65 raises the retainer posts 61, 62 so that both the shifter bars are released from the retaining lock of the retainer posts and thereupon the shifter bar upon which the spring compressed is related is moved by the spring until it occupies a position such that the spring is retained again by pins 59 related and the shifter bar is then in the position where its related dog clutch 28 or 31 has one end engaged with the related spur gear or dog clutch 13, as predetermined, and in this position of the shifter bar if the clutch pedal is then released the retainer posts drop and again lock the shifter bars against movement and the clutch is engaged thereby engaging the drive through the gears or directly as predetermined. When any shifter bar is out of its mid or normal position the related actuating yoke bar may be moved by the cam related to a position such that the shifter bar will be carried directly through the mid position to the opposite engaging position of the related double ended dog clutch. In any movement of the shifter bars only one shifter bar may move out of the mid position at one time the locking rollers 36, 37 preventing interference that is providing interlocking, but the action of the springs is such that, in the proper position of the parts, one shifter bar may be carried to mid position and the other shifter bar may then instantly under the force of a related spring move to an engagement position. When the clutch 13 is engaged, so that drive is direct, the related shifter bar also has forced the yoke lever 69 forward and with it dog clutch 15 out of engagement so that the shaft 18 and the gears are not then actuated, but whenever the dog clutch 28 is moved rearwardly to its neutral or opposite engagement position, the dog clutch 15, is then permitted by the action of the spring 70 upon yoke lever 69 to be forced into a position of engagement with spur gear 14, so that in all the other positions except the direct drive position or engagement the spur gear 14 and thereby the secondary shaft 18 and the gears with it are revolved by shaft 6 by the engine crank shaft 2.

While I have shown particular devices and combinations of devices in the illustration of my invention I contemplate that other detailed devices and combinations of devices may be used in the realization of my invention without departing from the scope, spirit and intention thereof.

What I claim is:

1. In a transmission means, a driving element and a driven element, related sets of transmission units adapted to render transmission at varying ratios between the driving and driven elements, a clutch adapted to engage the driving element with an engine element, a selecting unit adapted to cause engagement of a set of transmission units when moved to one engagement position and adapted to cause engagement of another set of transmission units when moved to another engagement position, an actuating unit movable from a neutral position to actuating positions and having yieldable springs adaptable to yieldably exert moving effort upon the selecting unit to either engagement position as predetermined by the actuating position of the actuating unit, and a hand operable revolvable means adapted to locate the actuating unit, and a manually controlled releasing means adapted to retain the selecting unit until released.

2. In a transmission means, a driving element and a driven element, related sets of transmission units constantly engaged and adapted to render transmission at varying ratios between the driving and driven elements, a clutch adapted to engage the driving elements with an engine element, a selecting unit adapted to cause engagement of a set of transmission units when moved to one engagement position and adapted to cause engagement of another set of transmission units when moved to another engagement position, an actuating unit movable from a neutral position to actuating positions, and having yieldable springs adaptable to yieldably exert moving effort upon the selecting unit to either engagement position as predetermined by the actuating position of the actuating unit, and means adapted to locate the actuating unit, and a manually controlled releasing means adapted to retain the selecting unit until released.

3. In a transmission means, a driving element and a driven element, related sets of transmission units constantly engaged and adapted to render transmission at varying ratios between the driving and driven elements, a clutch adapted to engage the driving element with an engine element, a selecting unit adapted to cause engagement of a set of transmission units when moved to one engagement position and adapted to cause engagement of another set of transmission units when moved to another engagement position, an actuating unit movable from a neutral position to actuating positions and having yieldable springs adaptable to yieldably exert moving effort upon the selecting unit to either engagement position as predetermined by the actuating position of the actuating unit, and a revolvable cam adapted to locate the actuating unit, and a manually controlled releasing means adapted to retain the selecting unit until released.

4. In a transmission means, a driving element and a driven element, related sets of transmission units constantly engaged and adapted to render transmission at varying ratios between the driving and driven elements, a clutch adapted to engage the driving element with an engine element, a pair of selecting units one adapted to cause engagement of either of two sets of transmission units when moved to one engagement position and adapted to cause engagement of another of the related two sets of transmission units when moved to another engagement position, the other of the pair of selecting units adapted to cause engagement of either of two other sets of transmission units when moved to one engagement position and adapted to cause engagement of another of the related two sets of transmission units when moved to another engagement position, a pair of actuating units movable individually from neutral positions to actuating positions and having yieldable springs adaptable to yieldably exert moving effort upon a selecting unit to either engagement position as predetermined by the actuating position of the actuating unit, and a revolvable cam adapted to locate the actuating units, and a manually controlled releasing means adapted to retain the selecting unit until released.

In testimony whereof I hereunto affix my signature.

ADOLPHE C. PETERSON.